A. F. YARROW.
SYNCHRONIZING DEVICE FOR FACILITATING THE COUPLING OF ROTATING SHAFTS.
APPLICATION FILED JUNE 10, 1913.

1,110,414.  Patented Sept. 15, 1914.

UNITED STATES PATENT OFFICE.

ALFRED FERNANDEZ YARROW, OF STIRLING, SCOTLAND.

SYNCHRONIZING DEVICE FOR FACILITATING THE COUPLING OF ROTATING SHAFTS.

1,110,414. Specification of Letters Patent. Patented Sept. 15, 1914.

Application filed June 10, 1913. Serial No. 772,928.

*To all whom it may concern:*

Be it known that I, ALFRED FERNANDEZ YARROW, a subject of the King of Great Britain, residing in Stirling, in the county of Stirling, Scotland, and whose post-office address is Campsie Dene, Blanefield, in the county of Stirling, Scotland, have invented certain new and useful Improvements in Synchronizing Devices for Facilitating the Coupling of Rotating Shafts, of which the following is a specification.

The primary object of this device is to provide means for readily determining the moment at which the speeds of rotation of two shafts revolving at relatively varying speeds become the same or so nearly the same that they can be coupled together by means of a clutch of ordinary character without serious shock.

The device which constitutes this invention depends upon the optical effect produced by the rotation of a screw-threaded wheel or shaft, or either rotating member upon the periphery of which a screw thread is cut or a spiral line or equivalent series of dots is marked. With such a device there is an apparent progression of the thread or spiral line in the direction of the axis of rotation, the rate of this apparent progression depending upon the speed of rotation. If therefore such a screw thread or spiral line is formed upon the periphery of two conveniently contiguous disks or pulleys or the like, one carried by each shaft and the two shafts are rotating at different speeds, it will be obvious that as the speeds of rotation approximate the apparent rate of progression of the two spirals will also approximate and thereby give a visual indication whereby the moment at which the shafts may be coupled without excessive shock can be determined.

The precise nature of my invention will be best understood by reference to the accompanying drawings, in which I have shown one form, it being premised, however, that various changes may be made in the details of construction and general arrangement of the parts, without departing from the spirit and scope of my invention, as defined in the appended claims.

Figure 1:
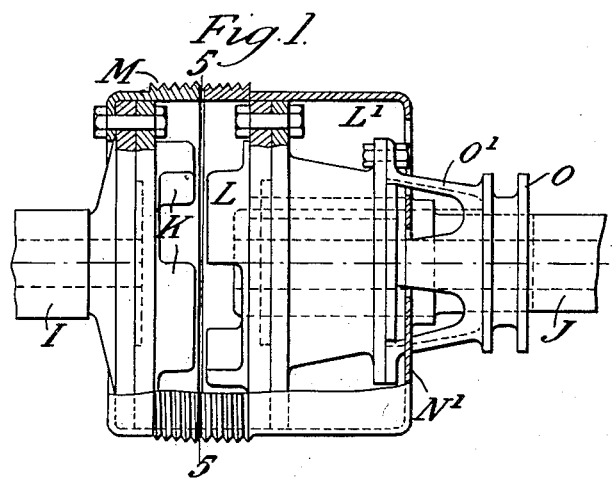
Figure 2:
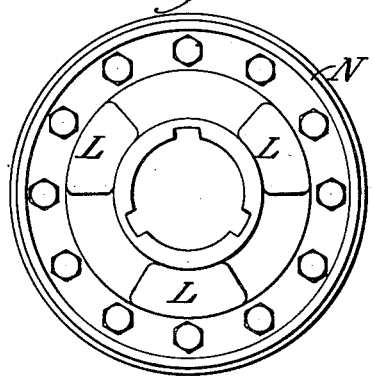

Figure 1 of the drawings is a side elevation partially in section of one form of apparatus embodying my invention; and Fig. 2 is a transverse section on the line 5.

In these figures I have shown two shafts I, J, which are adapted to be coupled to each other by the two coupling members K and L of the ordinary dog clutch type. The member K is secured to the shaft I, while the member L is slidably secured by means of a feather to the shaft J. Preferably, in order that the clutch members will always engage in the same relative positions, one or more of the dogs on each clutch member differ in circumferential dimensions from the remainder, as shown more particularly in Fig. 2.

Secured around the edge of the clutch member K is a sleeve M having a screw thread cut upon its periphery, a similar sleeve N being secured by spokes N' to the shaft J. This sleeve having also upon its periphery a screw thread of the same pitch and sense as the screw thread on sleeve M. The collar O by which the slidable clutch member L is actuated is fitted upon the shaft J beyond the spokes N' and secured to the clutch member L by arms O' which project between the spokes N' and are bolted to a flange L' upon the rear of the clutch member.

As the two screw threads have the same pitch and sense, their apparent rate of progression will be identical when the shafts are rotating at the same speed, but should one shaft be revolving faster than the other the apparent rates of progression of the screw threads will be different one thread appearing to overtake or to run away from the other, and by this means even a small difference in the speeds of revolution of the two shafts is readily detected.

Instead of securing the sleeve N rigidly to the shaft J, it may be secured upon the clutch member L, but in this case there would be a gap between the two sleeves when the clutch is out. Also, instead of screw theads, spiral lines or equivalent series of dots may be permanently marked upon the peripheries of the sleeves M, N.

The indicating sleeves M, N instead of being secured to the shafts to be coupled, may be mounted upon shafts geared therewith and running at the same or proportionate speeds.

It is obvious that the screw threads or spiral lines may be formed upon the peripheries of the shafts themselves so long as they are sufficiently near to each other to enable them to be observed simultaneously.

Having thus described my invention and the best means I know of carrying same into effect, I claim—

1. A device for facilitating the coupling of rotating shafts comprising the combination with each shaft of a member rotating therewith, said members rotating in proximity to each other and having permanent helices upon the peripheries thereof, said helices being of the same pitch and sense.

2. In a coupling for rotating shafts the combination with each shaft to be coupled of a clutch member thereon and of a sleeve adapted to rotate therewith, the sleeve of each shaft being arranged to rotate adjacent to the sleeve of the other shaft, and each being provided on its periphery with a helix of the same pitch and sense.

3. A device for facilitating the coupling of a plurality of rotating shafts, comprising a member rotatably connected with each shaft, said members rotating in proximity to each other and each having a spiral line permanently marked upon the periphery thereof, said spiral lines being of the same pitch and sense.

4. A device for coupling a plurality of rotating shafts, comprising a clutch member for each shaft, and a cylinder rotatably connected to each shaft, the cylinders of the two shafts being arranged to rotate adjacent to each other and being provided on their peripheries with spiral lines of the same pitch and sense.

5. In a coupling for rotating shafts the combination with each shaft of a clutch member rotating therewith, a member also adapted to rotate therewith, the members of the two shafts being arranged to rotate adjacent to each other, and a spiral line of the same pitch and sense on each of said members.

In testimony whereof I have signed my name to this specification in the presence of two subscribing witnesses.

ALFRED FERNANDEZ YARROW. [L. S.]

Witnesses:
W. W. MARRINER,
J. FERNIE.